UNITED STATES PATENT OFFICE.

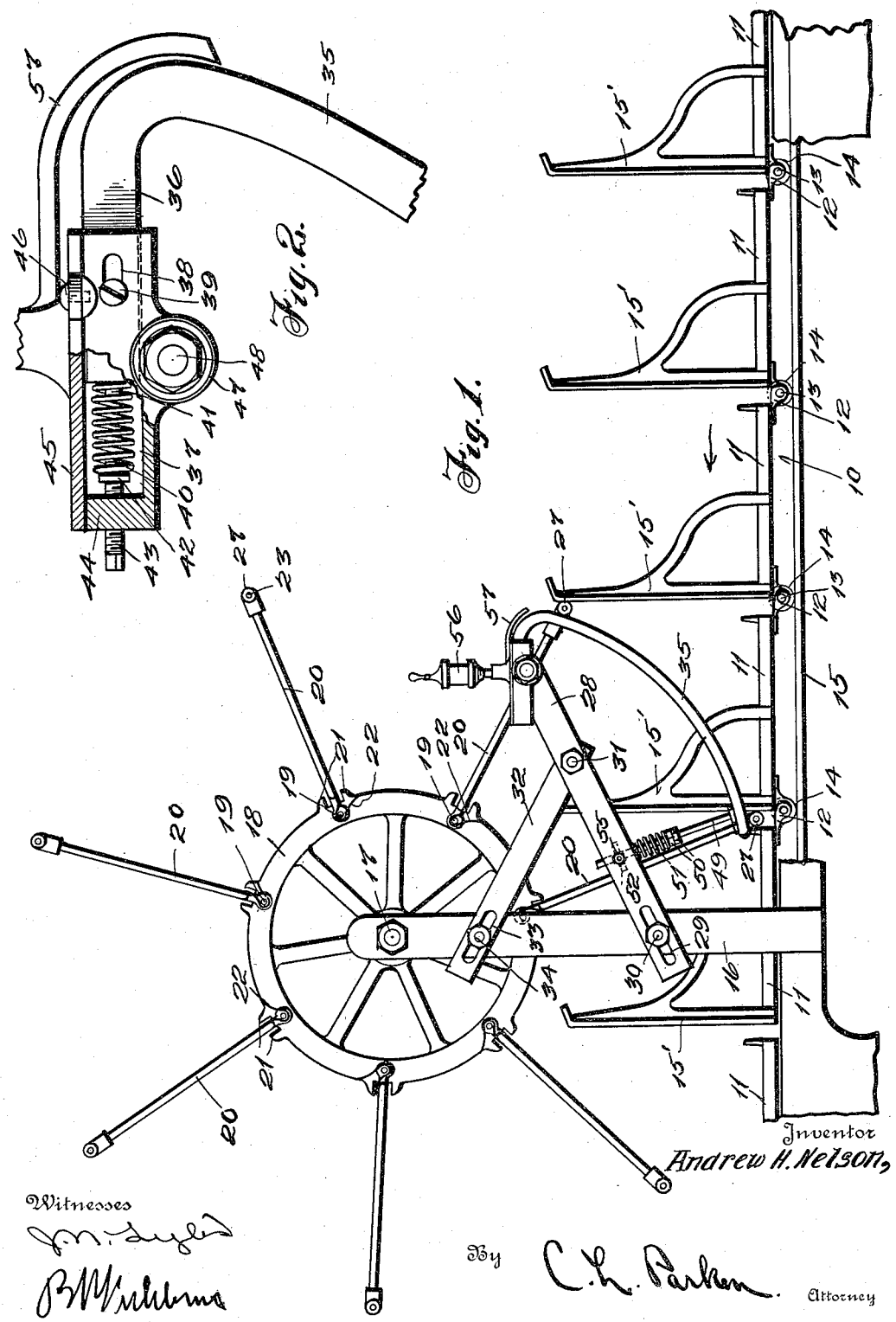

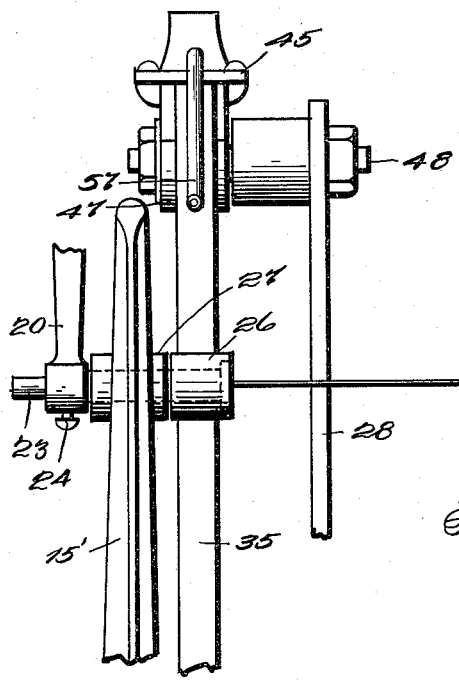
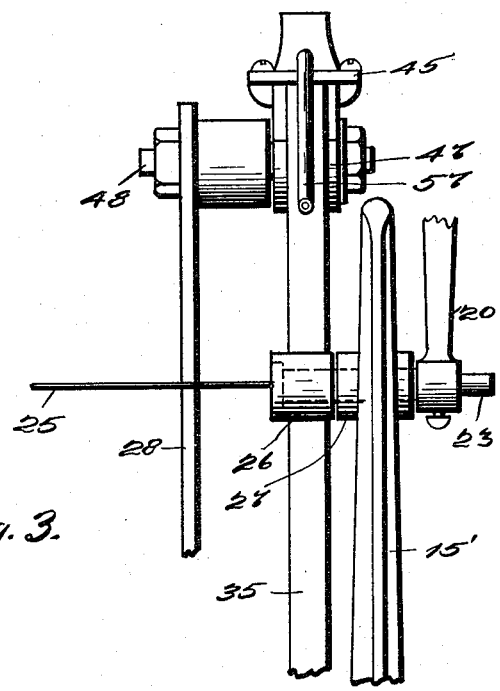
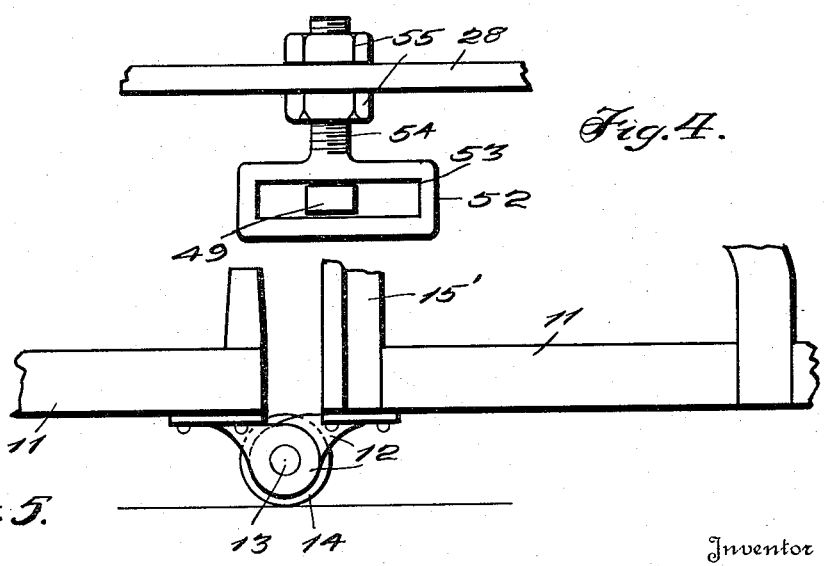

ANDREW H. NELSON, OF MASON CITY, IOWA.

GUIDE MEANS FOR BRICK-CUTTING MACHINES.

1,164,846. Specification of Letters Patent. Patented Dec. 21, 1915.

Application filed September 7, 1915. Serial No. 49,266.

*To all whom it may concern:*

Be it known that I, ANDREW H. NELSON, a citizen of the United States, residing at Mason City, in the county of Cerro Gordo and State of Iowa, have invented certain new and useful Improvements in Guide Means for Brick-Cutting Machines, of which the following is a specification.

My invention relates to improvements in machines for cutting a strip of plastic material, into bricks or the like, and has particular reference to guide means for the arms which carry the plastic material cutting elements or wires.

An important object of the invention is to provide means of the above mentioned character, adapted to coöperate with the arms of the reel, carrying the cutting elements or wires, so that such cutting elements will descend perpendicularly, through the plastic material, for properly cutting the same.

A further object of the invention is to provide guide means of the above mentioned character, adapted to properly take up shocks, upon its contact with the rollers carried by the arms of the reel.

A further object of the invention is to provide means of the above mentioned character, which are simple in construction, inexpensive to manufacture, and convenient in use.

Other objects and advantages of the invention will be apparent during the course of the following description.

In the accompanying drawings forming a part of this specification and in which like numerals are employed to designate like parts throughout the same, Figure 1 is a side elevation of a portion of a brick cutting machine, showing my guide means applied thereto, Fig. 2 is an enlarged fragmentary side elevation of one guide, embodied in the invention, parts being shown in section, Fig. 3 is a front elevation of the guides, taken at a right angle to the showing in Fig. 1, with parts broken away and portions of the machine omitted, Fig. 4 is a detail elevation of a socket element, and, Fig. 5 is a fragmentary side elevation of a traveling support or conveyer.

It is old in the art to provide a brick cutting machine embodying generally a traveling endless conveyer or support, for holding the bar or slab of plastic material. This endless conveyer is provided with outwardly extending standards, which contact with arms of a reel, to turn it. These arms carry wires or other cutting elements which descend through the plastic material upon the traveling support, and cut the same into bricks or the like. Such a construction is illustrated in the patent granted to J. Bensing, No. 411,638, under date of September 24, 1889. In view of the fact that this general construction is well known, the entire machine will not be described in this application, but only sufficiently to illustrate the application of my improvement, to a machine of this general type.

The numeral 10 designates a traveling support or endless conveyer, embodying sections or links 11, pivotally connected by means of apertured knuckles 12, receiving pins 13, also carrying rollers 14. These rollers travel upon suitable tracks 15, for guiding the traveling support during its movement. Any suitable means may be employed to effect the travel of the support or endless conveyer. Rigidly connected with each side of each section or link 11 is an outwardly extending standard 15', which is vertical when contacting a portion of a reel, to be described.

The numeral 16 designates vertical stationary standards, having their upper ends apertured for receiving a horizontal transverse shaft 17, upon which are rigidly mounted wheels 18. Pivotally connected with the wheels 18, as shown at 19, are pairs of transversely alined radially disposed arms 20, adapted to partake of swinging movement within the space between lugs 21. Each arm 20 is held in the normal radially disposed position by a spring 22 or the like, as shown.

As more clearly shown in Fig. 3, the arms 20 are provided at their outer ends with apertures, receiving shafts 23, clamped therein by bolts 24 or the like. These bolts are provided at their inner ends with suitable means for connection with a cutting wire or element 25, as shown. Rotatably mounted upon the shafts 23 are inner and outer rollers 26 and 27, for a purpose to be described.

The numeral 28 designates preferably angularly arranged support-bars, the lower ends of which are preferably provided with slots 29, receiving clamping bolts 30, carried by the vertically stationary standards 16. Pivotally connected with the outer portions of the support-bars 28 by means of bolts 31 or the like, are brace bars 32, having elongated slots 33, receiving clamping bolts 34, rigidly attached to the stationary vertical standards 16, as shown. It is thus apparent that the support bars 28 are rigidly held in place upon the vertical standards 16 and may be angularly adjusted, when desired.

The numeral 35 designates longitudinally curved guides, which are preferably rigid and are arranged upon opposite sides of the traveling support 10 and outwardly of the same. The upper end of each guide 35 is bent to form a preferably straight substantially horizontal portion 36, mounted to slide or reciprocate within a tubular socket 37, as more clearly shown in Fig. 2. This socket is provided upon one side with an elongated slot 38, receiving a screw 39 or the like, attached to the end portion 36, to limit the outward movement of the same, but permits of its inward movement for a considerable extent. The inward movement of the portion 36 of the guide 35 is opposed by a suitably stiff coil spring 40, surrounding an extension 41 formed upon the portion 36. The opposite end of this coil spring engages a ring 42, formed upon an adjusting screw 43, having screw-threaded engagement within an opening formed through the closed end 44 of the tubular socket 37, whereby the tension of the spring 40 may be adjusted. The top of the socket 37 is preferably formed open and is covered by a plate 45, rigidly attached thereto by screws 46 or the like.

As more clearly shown in Figs. 1 and 2, the socket 37 is provided with a depending apertured knuckle 47, receiving a bolt 48, passing through the upper end of the support bar 28, whereby the housing 37 and the guide 35 are pivotally connected with the upper end of the support-bar to be swung in a substantially vertical plane with relation thereto.

Rigidly connected with the lower ends of the guides 35 are rods 49, carrying nuts 50. Surrounding each rod 49 above the nuts is a compressible coil spring 51, which has its upper end in engagement with a guide socket 52, having an opening 53, receiving the upper end of the rod 49, as more clearly shown in Fig. 4. The guide socket 52 carries a screw-threaded shank 54, extending through the aperture in the support bar 28 and clamped thereto by nuts 55 or the like. The opening 53 is elongated so that the rod 49 may partake of proper lateral movement upon the swinging of the curved guide 35.

The rollers 26 and 27 are adapted to contact with the guides 35 and the standards 15, respectively, as shown in Fig. 3.

Rigidly mounted upon each plate 45 is an oil can or receptacle 56, having an outlet pipe 57, arranged upon the outer side of the guide 35, adjacent its upper end, for lubricating the contacting face thereof, as clearly shown in Figs. 1 and 2.

The operation of the machine is as follows: The traveling support 10 moves in the direction of the arrow, and the standards 15' contact with the rollers 27 carried by each pair of arms 20, as illustrated in Fig. 1. The reel embodying the arms 20 is thus rotated by the movement of the standards 15'. As each pair of rollers 27 contact with the upper portion of the adjacent standards 15', the rollers 26 are brought into contact with the curved guides 35 and travel longitudinally of the same in a downwardly direction, whereby the rollers 26 are prevented from moving away from the vertical edges of the standards 15'. This causes the wire 25 to travel vertically, for accurately cutting the brick. When the standards 15' contact with the rollers 27, the arms 20 are free to partake of a slight swinging movement with relation to the wheel 18, as defined by the space between the lug 21. When the rollers 26 contact with the guides 35, these guides are capable of partaking of restricted bodily movement in a forwardly direction, by virtue of the horizontal end portions 36, which are slidable in the sockets 37, and opposed in such movement by the springs 40. The guides 35 are also capable of partaking of swinging movements, which are opposed by the springs 51. It is apparent that yielding means are provided to take up all shocks and strains transmitted to the guides 35, and that binding action between the guides, rollers and standards is eliminated.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described the invention, I claim:—

1. The combination with a traveling support, of outwardly extending standards secured thereto, a supporting structure, a reel connected with the supporting structure and carrying radially disposed arms, rollers carried by the outer portions of the arms, longitudinally curved guides disposed near the standards of the traveling support and adapted to contact with the rollers carried by the arms, means for pivotally supporting the guides so that they can swing in the plane of rotation of the reel, and yielding means to oppose the swinging movement of the guides in one direction.

2. Guide means for the arms of a machine for cutting brick or the like, comprising longitudinally curved guide elements, pivoted sockets slidably receiving portions of the guide elements, yielding means to oppose the sliding movement of such portions of the guide elements, and yielding means to oppose the swinging movement of the guide elements.

3. Guide means for the arms of a machine for cutting brick or the like, comprising inclined guide elements having their upper ends provided with extensions, sockets within which the extensions are mounted to move longitudinally, springs arranged within the sockets to oppose the longitudinal movement of the extensions in one direction, and supporting means for the sockets.

4. Guide means for the arms of a machine for cutting brick or the like, comprising inclined guide elements having their upper ends provided with extensions, sockets within which the extensions are mounted to move longitudinally, springs arranged within the sockets to oppose the longitudinal movement of the extensions in one direction, means for pivotally supporting the sockets, and yielding means connected with the lower portions of the guide elements to oppose their swinging movement in one direction.

5. Guide means for the arms of a machine for cutting brick or the like, comprising inclined guide elements, pivot devices connected with the inclined guide elements to pivotally support them, yielding means to oppose the swinging movement of the guide elements in one direction, and lubricating devices attached to the pivoted devices to turn therewith and having outlet conduits for discharging lubricant upon the contacting faces of the guide elements.

In testimony whereof I affix my signature in presence of two witnesses.

ANDREW H. NELSON.

Witnesses:
   ROSE D. SNYDER,
   CLINTON E. CALLOW.

Copies of this patent may be obtained for five cents each, by addressing the "Commissioner of Patents, Washington, D. C."